April 24, 1928.  1,667,208
F. J. LAHER
PIVOTED LUGGAGE CARRIER
Filed Feb. 26, 1925
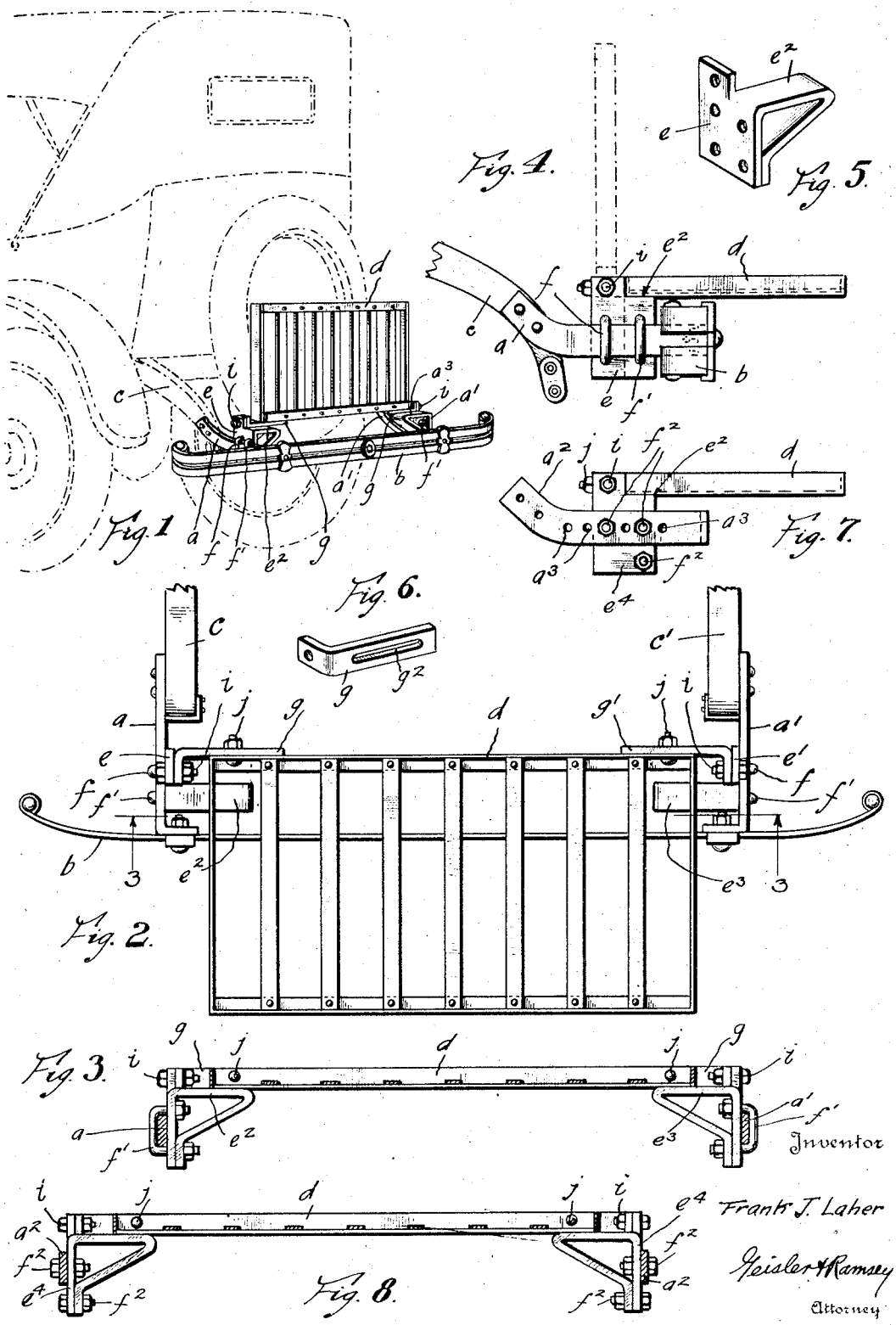

Patented Apr. 24, 1928.

1,667,208

UNITED STATES PATENT OFFICE.

FRANK J. LAHER, OF PORTLAND, OREGON.

PIVOTED LUGGAGE CARRIER.

Application filed February 26, 1925. Serial No. 11,764.

My invention relates to luggage carrier attachments for automobiles and especially to those that are to be attached to the vehicle-frame members extending rearwardly from the automobile and carrying a bumper.

The object of my invention is to provide an inexpensive, staunch luggage carrier attachment, including a rack which is pivotally carried so that it can either be arranged vertically or extended horizontally, rearwardly of the automobile, in position to carry luggage.

A further object of my present invention is to provide a luggage carrier which is so mounted that it can be adjusted longitudinally of the vehicle and thus to provide a space between the bumper bar supports at the rear end of the automobile or the devices carried thereby, such for example, a tire or tire rack. This feature of my present invention is important for the reason that bumpers and their supports, and also automobiles, vary greatly and thus a luggage carrier adapted to be used with different bumpers and automobiles must be adjustable over a relatively wide range.

A further object of my present invention is to provide a luggage carrier which may be secured to the supports for the bumpers rather than directly to the bumper bar; the securing devices being adjustable to permit the luggage carrier to be extended inwardly of said bumper so as to occupy the entire space between the bumper bar and the rear end of the automobile or devices carried thereby. I thus provide a luggage carrier at the rear end of the automobile which does not greatly extend its over-all length, if it extends said length at all, inasmuch as the luggage carrier in some vehicles can be mounted almost entirely within the space between the rear end of the vehicle and the bumper bar especially so if said space is not occupied by a tire or tire rack.

The devices comprising my invention and their relationship, one with another, are hereinafter described with reference to the drawings.

In the drawings:

Fig. 1 is a fragmentary perspective view of an automobile with a bumper carrier at the rear end thereof and my improved luggage rack carried thereby, the luggage rack and bumper with its supports being shown in full lines, and the automobile in dotted lines;

Fig. 2 is a plan view of the rear end of the vehicle frame provided with my attachment of which the luggage rack is shown as fully extended, arranged in its horizontal or carrying position;

Fig. 3 is a section taken on the line 3—3 of Fig. 2;

Fig. 4 is a side elevation of the left hand end of the devices shown in Fig. 2, and shows in dotted lines the luggage rack arranged in vertical position;

Figs. 5 and 6 are fragmentary perspective views of one of the brackets showing details of construction of my invention hereinafter fully described;

Fig. 7 is a side elevation corresponding with Fig. 4 but showing a modified construction of my invention; and Fig. 8 is a section similar to Fig. 3 showing the modified mounting devices illustrated in Fig. 7.

My attachment comprises supporting members $a$, $a'$ for the bumper bar $b$, said supporting members being fastened to the vehicle frame ends $c$, $c'$ of an automobile. The extremities of the supporting members are bent to right angles to provide surfaces to which to secure the bumper bar. As is shown in Fig. 1, said bumper $b$ is arranged so as to extend rearwardly of the rear fenders of the automobile. The tire or tire rack commonly carried at the rear of automobiles usually extends between the vehicle ends $c$, $c'$ and thus there is a space between these frame ends and the bumper which is normally unoccupied.

By my invention I utilize said space by mounting my improved luggage carrier $d$ on brackets $e$, $e'$ which are adjustably fastened to the supporting members $a$, $a'$ for the bumper at a point slightly rearwardly of the vehicle frame ends, $c$, $c'$, as shown clearly in Fig. 2. By mounting the luggage rack in this manner, I do not increase the over-all length of the automobile by the entire width of the luggage rack, as would be the case if I mounted the luggage carrier directly to the bumper bar $b$.

On the supporting members $a$, $a'$ are mounted brackets $e$, $e'$, which are made left and right hand and preferably are clamped to the supporting members $a$, $a'$ by U-bolts $f$. Two U-bolts preferably are provided to prevent said bracket $e$, $e'$ from twisting about said connection when a load is placed upon the luggage rack, and incidentally the U-bolts permit the bracket $e$, $e'$ to be moved relatively to the bumper, the supporting members $a$, $a'$ being made of sufficient length.

Said brackets $e$ and $e'$ are preferably formed from a single piece of metal and shaped as shown in Fig. 5. The portions $e^2$ and $e^3$ of these brackets are bent at right angles so as to provide strong and rigid supporting surfaces for the luggage carrier $d$ and the luggage carried thereon, when the luggage carrier is arranged in its carrying position. If the luggage carrier be supported by the bumper it might in some cases be tilted at an inconvenient angle, since the bumpers on the market which could be used as one element of my attachment vary so in width.

One of said U-bolts $f'$ is made with one leg longer than the other so as to extend through said bent back portion of the brackets $e$ or $e'$ as shown in Fig. 3.

Figs. 7 and 8 illustrate other means of adjustably mounting the brackets to the supporting members $a^2$ are provided with a number of holes $a^3$ as shown in Fig. 7. Similarly spaced holes are provided in the bracket $e^4$ so that bolts $f^2$ can be fastened through said bracket $e^4$ and said support $a^2$. Said bracket $e^4$ can thus be adjusted longitudinally on said supporting members $a^2$ and fastened in any position in which it is thus adjusted.

I prefer for mounting the brackets $e$ and $e'$ the means shown in Figs. 1 to 4 to the ones last described, and shown in Figs. 7 and 8, for the reason that said brackets $e$ and $e'$ and the luggage rack carried thereby can be adjusted more conveniently. Besides too many holes drilled in the supporting members $a^2$ would weaken the latter.

I provide L-shaped members or angle bars $g$, $g'$ as intermediate members by which the luggage rack $d$ is fastened to the brackets $e$, $e'$, as shown clearly in Fig. 2. Said members or angle bars $g$, $g'$ are fastened to the brackets $e$, $e'$ by bolts $i$ and are fastened to the luggage rack $d$ by bolts $j$. Said bolts $j$ pass through elongated slots $g^2$ in said members or angle bars $g$, $g'$. The members thus are adjustable, longitudinally of said rack, to accommodate the spacing between the brackets $e$, $e'$ carried by the supporting members $a$, $a'$. The spacing between the frame ends $c$, $c'$ differs widely in different standard makes of automobiles, and also in the spacing of the bumper supports $a$, $a'$. And therefore I have arranged my attachment so as to accommodate such variations, and my attachment may be used with any type of car or bumper.

Although my invention is described and shown with reference to the rear end of automobiles and to the bumper or other devices carried at that end it is equally adapted to the front end thereof and to the bumper or other devices carried at that end and thus I do not wish to be limited in my claims, which are appended hereto, to the rear end of the automobile nor to the bumper carried at said rear end.

I claim:

1. A luggage-carrying attachment for vehicles provided with logitudinally extending carrying members, comprising brackets, devices fastening said brackets on said members, each of said brackets formed of one piece and comprising a sole, a ledge normal to the plane of the latter, projecting a substantial distance therefrom, and a brace for said ledge bearing against said sole, the latter being provided with a hinge lug projecting above said ledge, and a luggage-rack pivoted between the hinge lugs of said brackets.

2. A luggage-carrying attachment for vehicles provided with longitudinally extending carrying members, comprising brackets, devices fastening said brackets on said members, each of said brackets formed of one piece and comprising a sole, a ledge normal to the plane of the latter, projecting a substantial distance therefrom, and a brace for said ledge bearing against said sole, the latter being provided with a hinge lug projecting above and located at one side of said ledge and a luggage-rack pivoted between the hinge lugs of said brackets.

3. A luggage-carrying attachment for vehicles provided with longitudinally extending carrying members, comprising brackets, devices fastening said brackets on said members, each of said brackets formed of one piece and comprising a sole, a ledge normal to the plane of the latter, projecting a substantial distance therefrom, and a brace for said ledge bearing against said sole, the latter being provided with a hinge lug projecting above and located at one side of said ledge and a luggage-rack, and means pivotally securing the latter to said hinge lugs of said brackets, said means being adapted to accommodate variations in the space separating said brackets.

4. A luggage-carrying attachment for vehicles provided with longitudinally extending carrying members, comprising brackets, devices fastening said brackets on said members, each of said brackets formed of one piece and comprising a sole, a ledge normal to the plane of the latter, projecting a substantial distance therefrom, and a brace for said ledge bearing against said sole, the latter being provided with a hinge lug projecting above and located at one side of said ledge, and an angle iron pivoted to the hinge lug of each of said brackets, said angle iron provided with one elongated slotted leg, a luggage-rack, and means fastening the same to said slotted leg, such means being adjustable in the slots of the latter.

5. A luggage-carrying attachment for vehicles provided with longitudinally extending carrying members, comprising brackets, devices fastening said brackets on said members, each of said brackets formed of one piece and comprising a sole, a ledge normal to the plane of the latter, projecting a substantial distance therefrom, and a brace for said ledge bearing against said sole, the latter being provided with a hinge lug projecting above and located at one side of said ledge, and an angle iron pivoted to the hinge lug of each of said brackets, said angle iron provided with one elongated slotted leg, a luggage-rack, means fastening the same to said slotted leg and bolts secured in the rear frame-member of the rack and extending through the slots of said leg.

6. A luggage carrier attachment for vehicles provided with longitudinally extended carrying members, comprising a rack and means for supporting the rack on said carrying members, said means including L-shaped brackets having one arm connected to said supporting means respectively and the other arm secured longitudinally adjustable to the rack adjacent the lateral sides thereof, the supporting means of the rack further including a portion adapted to support the rack when in carrying position.

7. A luggage carrier attachment for vehicles provided with longitudinally extended carrying members, comprising a rack and means for supporting the rack on said carrying members, said means including L-shaped brackets having one arm pivotally connected to said supporting means respectively and the other arm secured longitudinally adjustable to the rack adjacent the lateral sides thereof, the supporting means of the rack further including a portion adapted to support the rack when in carrying position.

8. A luggage carrier attachment for vehicles provided with longitudinally extended carrying members, comprising a rack and means for supporting the rack on said carrying members, said means including L-shaped brackets having one arm pivotally connected to said supporting means respectively and the other arm secured longitudinally adjustable to the rack adjacent the lateral sides thereof.

FRANK J. LAHER.